US011067227B2

(12) United States Patent
Kato et al.

(10) Patent No.: US 11,067,227 B2
(45) Date of Patent: Jul. 20, 2021

(54) AIRCRAFT WATER TANK AND METHOD FOR MANUFACTURING SAME (71) Applicant: The Yokohama Rubber Co., LTD., Tokyo (JP)

(72) Inventors: Hayato Kato, Hiratsuka (JP); Takahiro Ozawa, Hiratsuka (JP)

(73) Assignee: The Yokohama Rubber Co., LTD.

( * ) Notice: Subject to any disclaimer, the term of this patent is extended or adjusted under 35 U.S.C. 154(b) by 69 days.

(21) Appl. No.: 16/337,897

(22) PCT Filed: Sep. 6, 2017

(86) PCT No.: PCT/JP2017/032041
§ 371 (c)(1),
(2) Date: Mar. 28, 2019

(87) PCT Pub. No.: WO2018/061667
PCT Pub. Date: Apr. 5, 2018

(65) Prior Publication Data
US 2020/0024070 A1 Jan. 23, 2020

(30) Foreign Application Priority Data
Sep. 28, 2016 (JP) .............................. JP2016-189373

(51) Int. Cl.
*F17C 13/06* (2006.01)
*B65D 88/06* (2006.01)
(Continued)

(52) U.S. Cl.
CPC .............. *F17C 13/06* (2013.01); *B64D 11/00* (2013.01); *B65D 88/06* (2013.01); *B65D 88/14* (2013.01);
(Continued)

(58) Field of Classification Search
CPC .. F17C 13/06; F17C 13/08; F17C 1/00; F17C 1/16; F17C 2203/0604; F17C 2203/06;
(Continued)

(56) References Cited

U.S. PATENT DOCUMENTS 3,815,773 A    6/1974  Duvall et al.
5,287,988 A *  2/1994  Murray .................... F16J 12/00
                                                  220/589
(Continued)

FOREIGN PATENT DOCUMENTS

DE    10 2006 004 120    7/2007
FR          2 301 746     9/1976
(Continued)

OTHER PUBLICATIONS

International Search Report for International Application No. PCT/JP2017/032041 dated Nov. 14, 2017, 4 pages, Japan.
(Continued)

*Primary Examiner* — Chun Hoi Cheung
*Assistant Examiner* — Brijesh V. Patel
(74) *Attorney, Agent, or Firm* — Thorpe North & Western (57) ABSTRACT An aircraft water tank includes a conical surface of a skirt portion and a conical surface of an inner liner attached together using an adhesive, with an identical adhesive used in forming a fiber-reinforced resin layer on the inner liner via a filament winding method. When attaching with the adhesive, the adhesive is expelled at the outer circumferential edge of the skirt portion from between the conical surface of the skirt portion and the conical surface of the inner liner. Reinforcement fibers are applied on top of the protruding adhesive, and the adhesive impregnates into the reinforcement fibers. The protruding adhesive and the reinforcement fibers form a reinforcing member which connects a uniform stress surface of the skirt portion to a uniform stress surface
(Continued)

of the inner liner located radially outward of the skirt portion.

10 Claims, 4 Drawing Sheets

(51) Int. Cl.
    *B65D 90/04*     (2006.01)
    *F17C 1/00*     (2006.01)
    *F17C 1/16*     (2006.01)
    *B64D 11/00*     (2006.01)
    *B65D 88/14*     (2006.01)
    *F17C 13/08*     (2006.01)

(52) U.S. Cl.
    CPC .............. *B65D 90/042* (2013.01); *F17C 1/00* (2013.01); *F17C 1/16* (2013.01); *F17C 13/08* (2013.01); F17C 2203/06 (2013.01); F17C 2203/0602 (2013.01); F17C 2203/0604 (2013.01); F17C 2203/0636 (2013.01)

(58) Field of Classification Search
    CPC ..... F17C 2203/0602; F17C 2203/0636; B65D 88/06; B65D 90/042
    USPC ................ 220/589, 586, 588, 590, 592, 601
    See application file for complete search history.

(56) References Cited

U.S. PATENT DOCUMENTS

| | | | | |
|---|---|---|---|---|
| 5,429,845 A | * | 7/1995 | Newhouse | F17C 1/16 138/30 |
| 6,227,402 B1 | * | 5/2001 | Shimojima | F17C 1/16 220/581 |
| 8,231,028 B2 | * | 7/2012 | Matsuoka | F17C 13/06 220/582 |
| 2008/0251520 A1 | * | 10/2008 | Ota | F17C 1/16 220/586 |
| 2009/0107570 A1 | | 4/2009 | Weber | |
| 2010/0025411 A1 | | 2/2010 | Otsubo et al. | |
| 2011/0220660 A1 | | 9/2011 | Strack | |
| 2012/0037641 A1 | * | 2/2012 | Bruce | F17C 13/002 220/589 |
| 2014/0312043 A1 | * | 10/2014 | Sejima | B29C 45/0046 220/586 |
| 2015/0014332 A1 | * | 1/2015 | Nishibu | F17C 1/02 220/586 |
| 2016/0257403 A1 | | 9/2016 | Masuda | |
| 2017/0276294 A1 | * | 9/2017 | Almagro | B29C 65/48 |
| 2018/0142839 A1 | | 5/2018 | Taguchi et al. | |

FOREIGN PATENT DOCUMENTS

| | | |
|---|---|---|
| JP | 2008-144943 | 6/2008 |
| JP | 2008164131 A * | 7/2008 |
| JP | 2011-245796 | 12/2011 |
| JP | 2011-251736 | 12/2011 |
| JP | 2015-085946 | 5/2015 |
| WO | WO 2007/085277 | 8/2007 |
| WO | WO 2008/072046 | 6/2008 |
| WO | WO 2015/064424 | 5/2015 |
| WO | WO 2016/194574 | 12/2016 |

OTHER PUBLICATIONS

European Office Action for European Application No. 17855625.4 dated Apr. 3, 2020, 6 pages, Germany.

* cited by examiner

AIRCRAFT WATER TANK AND METHOD FOR MANUFACTURING SAME

TECHNICAL FIELD

The present technology relates to an aircraft water tank and a method for manufacturing the same.

BACKGROUND ART

Conventionally, an aircraft water tank includes a tank body including an inner liner and a fiber-reinforced resin layer covering the inner liner, and the tank body includes a cylindrical portion and dome portions provided on both sides of the cylindrical portion.

In the aircraft water tank, an opening for cleaning the inside of the tank body is provided in the center of the dome portions on both sides. The opening includes a metal mouthpiece fitted to the center of the dome portion and a lid detachably joined to the mouthpiece via an O-ring.

The mouthpiece includes a tubular portion formed with a female thread to which a male thread of the lid is screwed and a skirt portion that widens outward in the radial direction of the tubular portion from the end portion of the tubular portion. The inner liner is attached to an inner circumferential surface of the skirt portion with adhesive and the fiber-reinforced resin layer is attached to an outer circumferential surface of the skirt portion.

A radially outward outer circumferential portion of the skirt portion gradually decreases in thickness as the skirt portion progresses outward in the radial direction, and the outer circumferential end is a section with a manufacturing thickness.

For this reason, when the surface shape of the outer circumferential surface of the skirt portion is formed, for example, with a uniform tension curve, and the shape of the dome portion which is formed only of the inner liner and the fiber-reinforced resin layer, is formed with a uniform stress surface, a level difference occurs at the section on the fiber-reinforced resin layer in the vicinity of the skirt portion outward of the skirt portion in the radial direction, because the outer circumferential end of the skirt portion has a thickness.

In an aircraft water tank, water inside is discharged from a water supply tank port by feeding air through a pressurizing tank port to increase the internal pressure.

Thus, when the cross-sectional shape of the dome portion is a non-contiguous shape that includes a level difference due to the pressure being repeatedly applied to the aircraft water tank, stress will concentrate locally which is disadvantageous in improving durability.

Thus, to improve durability, an outer circumferential surface of the dome portion is required to be a smooth continuous surface without a level difference.

Conventionally, the inner circumferential surface of the skirt portion and the outer circumferential surface of the inner liner are adhered with a urethane resin, and the urethane resin expelled to the outer circumferential edge of the skirt portion is wiped off. After the urethane resin is cured, the level difference between the outer circumferential end of the skirt portion and the outer circumferential surface of the inner liner is filled with the epoxy-based adhesive.

The reason why the urethane resin is used for bonding the inner circumferential surface of the skirt portion of the mouthpiece and the outer circumferential surface of the inner liner together is that, because the mouthpiece and the inner liner are formed of materials having different elastic moduli, it was thought that when inner pressure is applied to the tank, use of urethane-based adhesive having a small elastic modulus would enable the stress generated between the skirt portion of the mouthpiece and the inner liner to be absorbed by the deformation of the adhesive.

In addition, the reason for using an epoxy-based adhesive different from the urethane resin as an adhesive to fill the level difference is as follows.

An operation to fill the level difference using an epoxy-based adhesive on the inner liner is performed after bonding the skirt portion to the inner liner using urethane resin. This is because using the same epoxy-based adhesive for filling the level difference, which is the same adhesive used in forming the fiber-reinforced resin layer on the inner liner using the filament winding method, is advantageous in terms of compatibility between the adhesives and improving adhesion between the level difference filled-portion and the fiber-reinforced resin layer.

To enhance the adhesiveness of the epoxy-based adhesive, the urethane resin expelled to the outer circumferential edge of the skirt portion is wiped off, and the level difference is filled with epoxy-based adhesive after waiting the time (about one day) for the urethane resin to cure. As a result, the process is complicated and disadvantageous in increasing the efficiency for manufacturing the aircraft water tank.

Further, even when there is good compatibility between the urethane resin and the epoxy-based adhesive, and the urethane resin or the epoxy-based adhesive can be used to fill the level difference, waiting time for the adhesive bonded to the mouthpiece to be cured is required for the following reason.

Namely, a large level difference means that the volume of the adhesive to fill the level difference is large. Thus, it has been difficult to uniformly finish the level difference with manual work only.

As a result, it has been necessary to set the inner liner on the device that rotates the inner liner and fill the level difference with adhesive while turning the inner liner, like a potter's wheel.

In this case, in order to mount the inner liner with the level difference to be filled on the rotating device, it is necessary that the mouthpiece and the inner liner are already adhered to each other and that the adhered mouthpiece is mounted to a rotating device after a rotation part is attached to the mouthpiece.

Thus, waiting time for the adhesive to be cured is required after bonding the mouthpiece to the inner liner. Also, for the above reason, it is not necessary to use the same type of adhesive of the adhesive for the mouthpiece and the adhesive for filling the level difference.

As a result of diligent research, the present inventors have found that, even when the mouthpiece and the inner liner are formed of materials having different elastic moduli, and the skirt portion of the mouthpiece and the inner liner are bonded with an adhesive such as an epoxy-based adhesive having a higher elastic modulus than urethane-based adhesives, when inner pressure is applied to the tank, effects on the adhesives and the inner liner was determined to be minimal and negligible.

SUMMARY

The present technology provides an aircraft water tank with enhanced manufacturing efficiency and reduced cost, and a method for manufacturing the same.

An embodiment of the present technology is an aircraft water tank, including:

a mouthpiece provided at a center of a dome portion, the dome portion including an inner liner and a fiber-reinforced resin layer, the mouthpiece comprising;

a tubular portion penetrating through an opening of the inner liner and the fiber-reinforced resin layer and to which a lid is joined; and a skirt portion extending radially outward, between the inner liner and the fiber-reinforced resin layer, from an entire outer circumferential portion of the tubular portion and attached around the opening to the inner liner and the fiber-reinforced resin layer with an adhesive; wherein the inner liner comprises a first curved surface portion attached to an inner circumferential surface of the skirt portion and a second curved surface portion located radially outward of the skirt portion;

the first curved surface portion is attached to an inner circumferential surface of the skirt portion with an identical adhesive as that used in attaching the fiber-reinforced resin layer to the inner liner;

reinforcing fibers are provided at a portion of the second curved surface portion in a vicinity of an outer circumferential end of the skirt portion via the adhesive expelled from between an inner circumferential surface of the skirt portion and the first curved surface portion radially outward of the skirt portion; and the adhesive expelled and the reinforcing fibers constitute a reinforcing member for connecting an outer circumferential surface of the skirt portion and the second curved surface portion of the inner liner in a continuous manner.

Another embodiment of the present technology is method for manufacturing an aircraft water tank, the method comprising:

providing a mouthpiece at a center of a dome portion, the dome portion comprising an inner liner and a fiber-reinforced resin layer, the mouthpiece including;

a tubular portion penetrating through an opening of the inner liner and the fiber-reinforced resin layer and to which a lid is joined, and a skirt portion extending radially outward, between the inner liner and the fiber-reinforced resin layer, from an entire outer circumferential portion of the tubular portion and attached around the opening to the inner liner and the fiber-reinforced resin layer with an adhesive; wherein the inner liner is formed with a first curved surface portion attachable to an inner circumferential surface of the skirt portion and a second curved surface portion located radially outward of the skirt portion;

the first curved surface portion is attached to an inner circumferential surface of the skirt portion with an identical adhesive as that used in attaching the fiber-reinforced resin layer to the inner liner;

reinforcing fibers are provided at a portion of the second curved surface portion in a vicinity of an outer circumferential end of the skirt portion via the adhesive expelled from between an inner circumferential surface of the skirt portion and the first curved surface portion radially outward of the skirt portion; and the adhesive expelled and the reinforcing fibers constitute a reinforcing member for connecting an outer circumferential surface of the skirt portion and the second curved surface portion of the inner liner in a continuous manner.

According to the present technology, by forming the outer circumferential surface of the dome portion with a curved surface having no level difference, stress concentration can be suppressed, which is advantageous in increasing the durability of the aircraft water tank that is subjected to repeated pressure.

In addition, the time to wait to cure the adhesive and the operation to wipe off the adhesive expelled to the outer circumferential edge of the skirt portion, which have been required in the process of adhering the inner liner to the skirt portion, becomes unnecessary. The process of adhering the inner liner to the skirt portion and the process of attaching the reinforcing material may be performed in a single step. This is advantageous in increasing work efficiency and reducing cost.

DETAILED DESCRIPTION

First Embodiment

Hereinafter, an aircraft water tank according to an embodiment of the present technology will be described together with a method for manufacturing the same.

First, a first embodiment will be described with reference to FIGS. 1 to 3.

Figure 1:
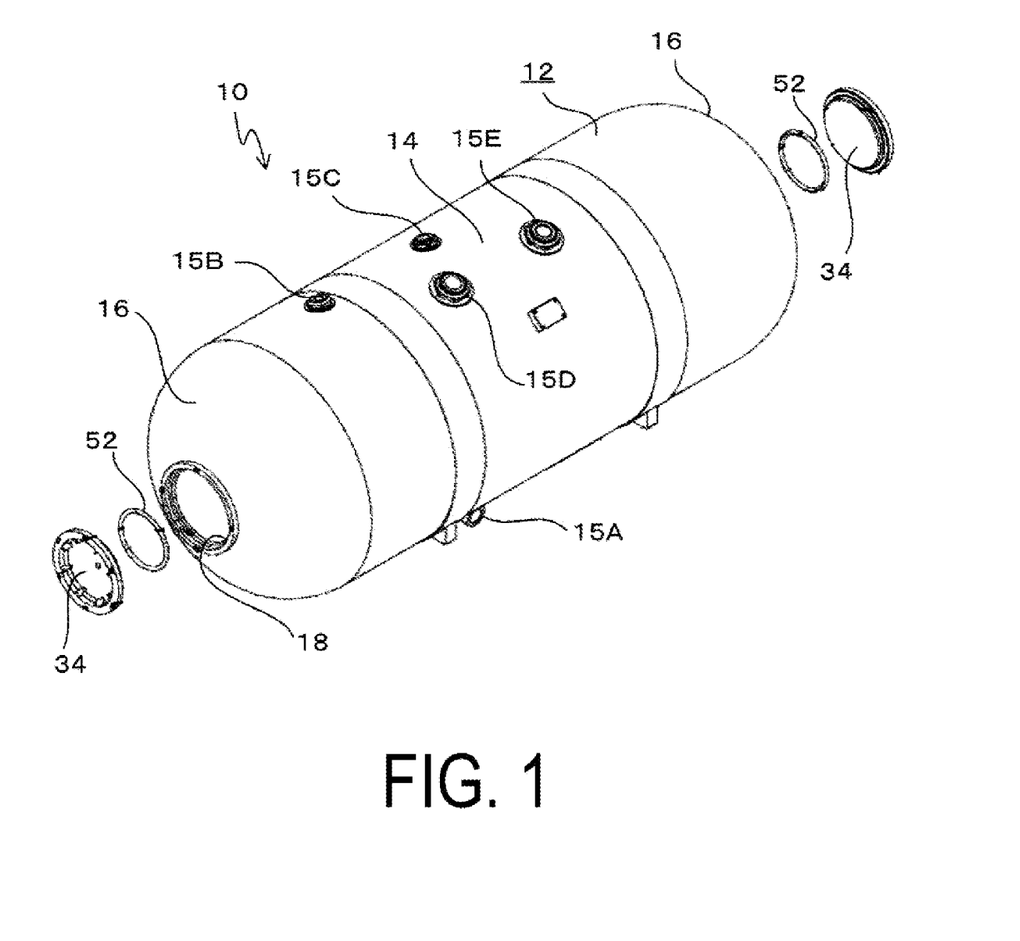
FIG. 1 is a perspective view of an aircraft water tank according to a first embodiment.
Figure 2:
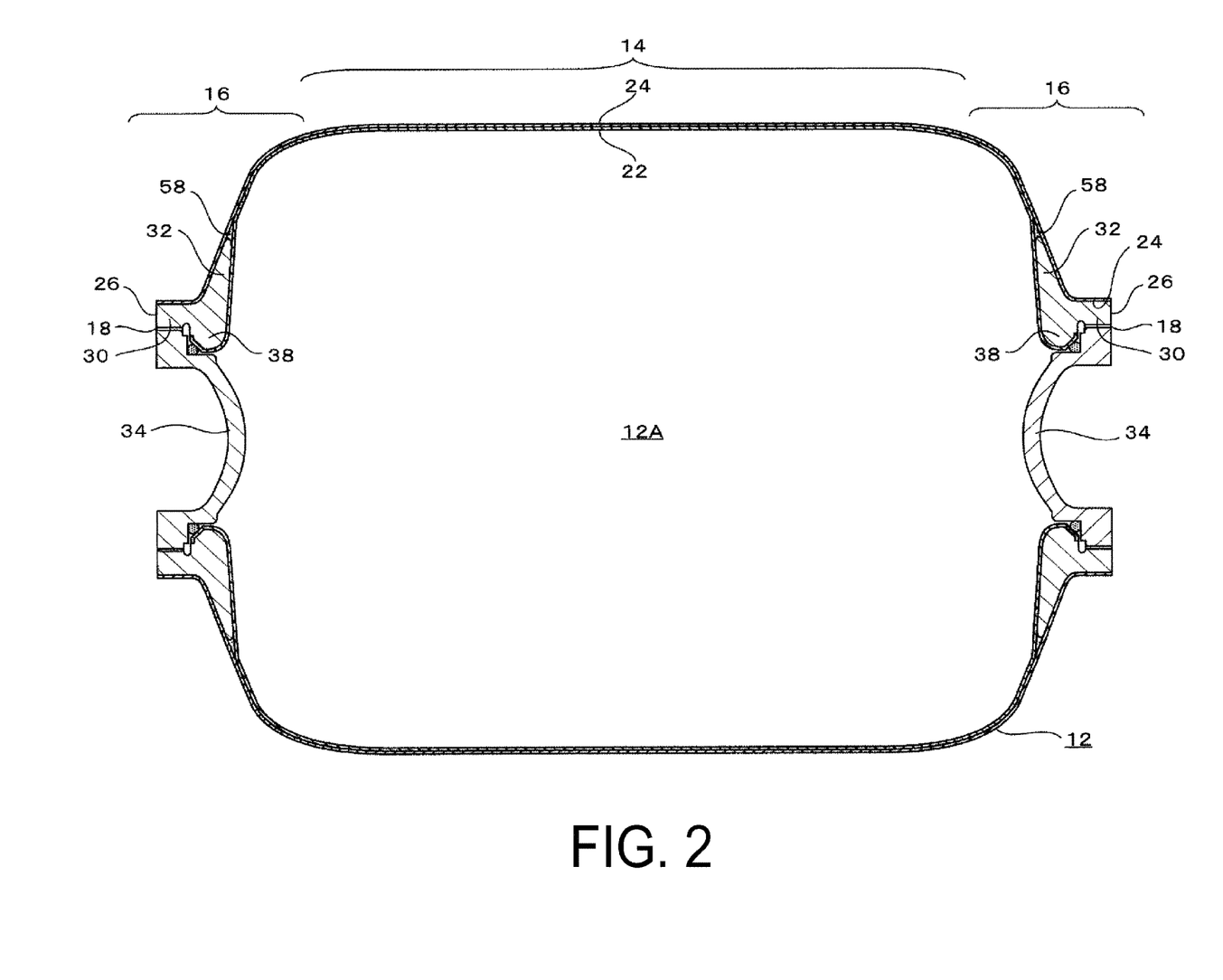
FIG. 2 is a cross-sectional view taken along line A-A in FIG. 1.

As illustrated in FIGS. 1 and 2, an aircraft water tank 10 installed in an aircraft and containing drinking water includes a tank body 12. The interior of the tank body 12 is a water containing space 12A.

The tank body 12 includes a cylindrical portion 14 and dome portions 16 provided on both sides of the cylindrical portion 14. In the present embodiment, the outer circumferential surface of the dome portion 16 is formed with a uniform stress surface.

An opening 18 for cleaning the interior of the tank body 12 is provided at the center of the dome portion 16 on either side, and the opening 18 is opened and closed by a lid 34.

Furthermore, a water supply tank port 15A communicating with the interior of the tank body 12 is provided at a lower portion of the cylindrical portion 14, and a pressurizing port 15B for pressurizing the interior of the tank body 12, a pressure switching port 15C, a water injection port 15D for supplying water to the tank body 12, and an overflow port 15E for discharging overflowed water are provided on an upper portion of the cylindrical portion 14.

As illustrated in FIG. 2, the tank body 12 includes an inner liner 22 forming the inner surface of the aircraft water tank 10 and a fiber-reinforced resin layer 24 covering the outer surface of the inner liner 22.

The inner liner 22 forms a hollow body forming the contour of the aircraft water tank 10 and is formed by blow molding. The blow molding involves melting a synthetic resin into a pipe-like shape, inserting the pipe into a mold, and pumping air into the interior of the pipe to obtain a molded product.

For the inner liner 22, various known FDA (Food and Drug Administration)-certified materials can be used, such as a polymer alloy resin, which is a thermoplastic resin, containing polyphenylene ether or polystyrene.

The fiber-reinforced resin layer 24 is formed via a filament winding method in which reinforcing fibers (filaments) impregnated with a thermosetting resin, are wound around the outer circumferential surface of the inner liner 22.

Various known synthetic resins such as epoxy resin can be used as the thermosetting resin. Various known fibers such as carbon fibers or glass fibers can be used as the reinforcing fibers.

The opening 18 is formed by an annular mouthpiece 26 attached between both ends of the inner liner 22 and both ends of the fiber-reinforced resin layer 24. When the aircraft water tank 10 is used, the opening 18 is closed off by the lid 34.

The mouthpiece 26 is made of metal and includes a tubular portion 30 disposed at the center of the dome portion 16 and a skirt portion 32 widening outward in a radial direction of the tubular portion 30 from the end portion of the tubular portion 30.

Figure 3A:
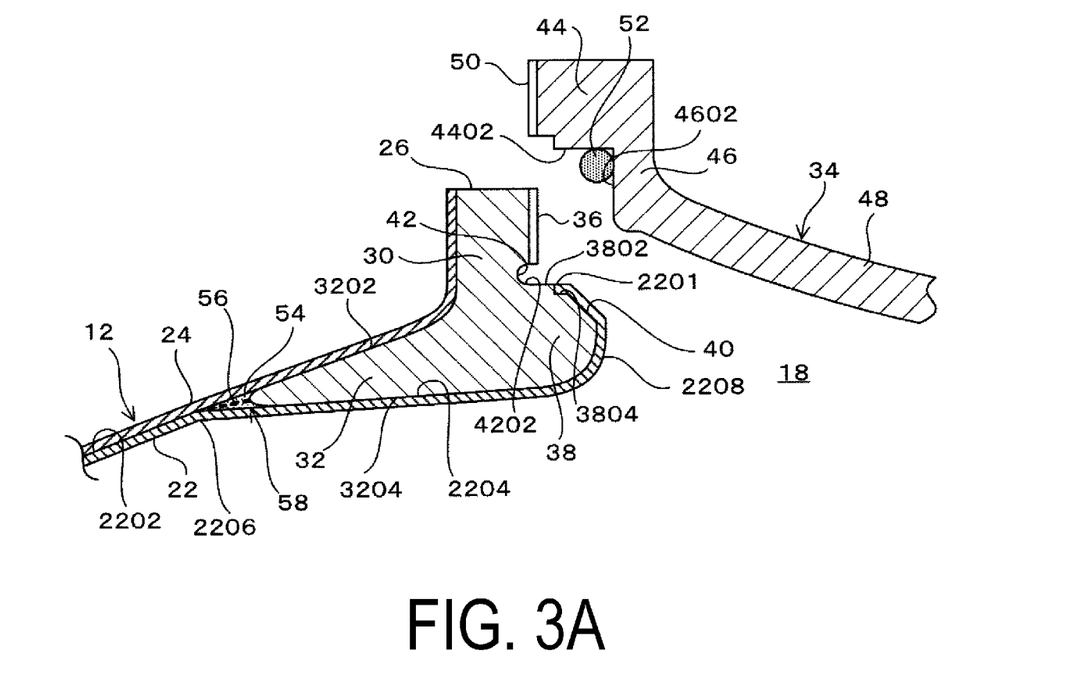
FIG. 3A is an enlarged view of a main portion of a mouthpiece and a lid in a state in which the mouthpiece and the lid are separated from each other in the aircraft water tank according to the first embodiment.
Figure 3B:
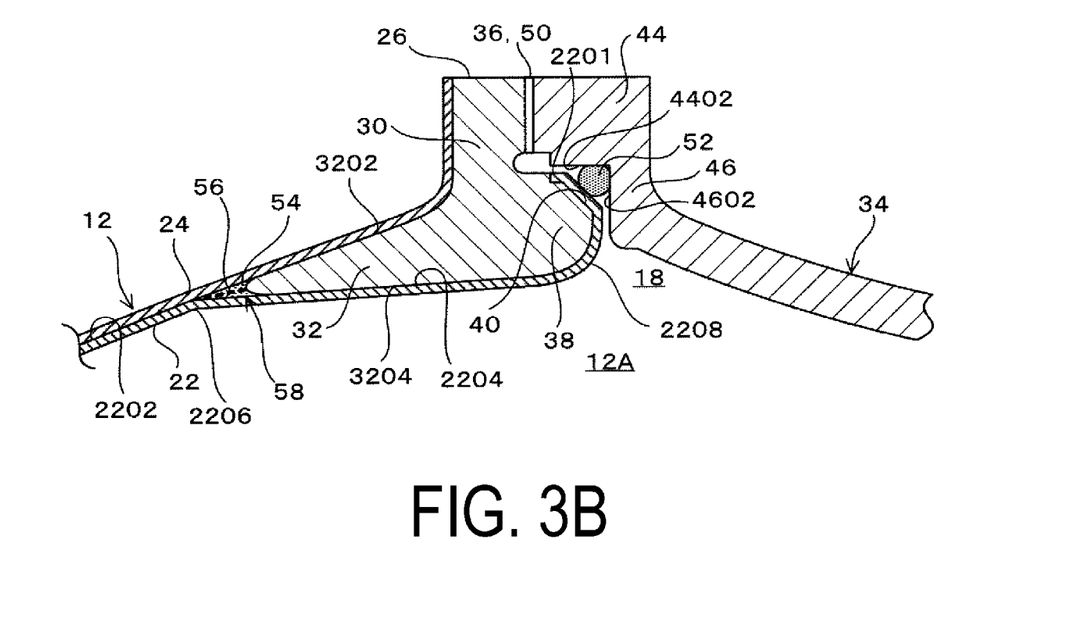
FIG. 3B is an enlarged view of a main portion of the mouthpiece and the lid in which the mouthpiece and the lid are joined, and the bent portion of the inner liner is located radially outward of the skirt portion of the mouthpiece.

As illustrated in FIGS. 3A and 3B, a female thread 36 is provided, at the inner circumferential portion of the tubular portion 30, as a mouthpiece-side joint portion to which the lid 34 is joined at a section away from the tank body 12 in the axial center direction of the tubular portion 30.

In addition, a bulging portion 38 is provided at the inner circumferential portion of the tubular portion 30 at a section close to the tank body 12 in the axial center direction of the tubular portion 30.

The bulging portion 38 bulges further inward in the radial direction than the inner diameter of the female thread 36. The surface of the bulging portion is formed as a curved surface projecting inward in the radial direction, and the end portion of the bulging portion 38 on the female thread 36 side is formed in a flat surface 3802 orthogonal to the axial center direction of the female thread 36.

An inclined surface 40 that is positioned further inward in the radial direction of the tubular portion 30 as it approaches the tank body 12 in the axial center direction of the tubular portion 30, is formed at the inner circumferential portion on the female thread 36 side of the bulging portion 38.

In addition, a groove 42 having an inner circumferential surface larger than the ridge diameter of the female thread 36 is formed at the boundary section between the female thread 36 and the bulging portion 38 at the inner circumferential portion of the tubular portion 30. This facilitates attaching an end portion 2201 of the inner liner 22 to a flat surface 3804 of the bulging portion 38 orthogonal to the female thread 36.

Of the pair of opposing side surfaces constituting the groove 42, a side surface 4202 on the bulging portion 38 side and the flat surface 3802 on the end portion on the bulging portion 38 side are located on the same plane and extend on a plane orthogonal to the axial center direction of the female thread 36.

The inner circumferential portion of the flat surface 3802 is the flat surface 3804 which runs in a direction away from the female thread 36 by the thickness of the inner liner 22, and the flat surface 3804 is connected to the inclined surface 40. The flat surface 3804 is located at a section located radially inward of the female thread 36.

The female thread 36, bulging portion 38, and groove 42 are formed coaxially.

The inner diameter of the skirt portion 32 gradually increases as the skirt portion progresses away from the bulging portion 38 and the thickness of the skirt portion 32 gradually decreases as the skirt portion progresses away from the bulging portion 38. The outer circumferential end of the skirt portion 32 is thinner than that known in related art but still has a manufacturing thickness.

The outer circumferential surface of the skirt portion 32 is formed as a uniform stress surface 3202, and the inner circumferential surface is formed as a conical surface 3204.

The inner liner 22 obtained by blow molding is formed as a uniform stress surface portion 2202 located radially outward of the skirt portion 32, and the imaginary extended face of the uniform stress surface portion 2202 is connected to the uniform tension curved surface 3202 of the skirt portion 32.

Further, the inner liner 22 is formed as a conical surface portion 2204 located radially inward of the entire outer circumference of the skirt portion 32, formed as a bent portion 2206 at the boundary section between the uniform stress surface portion 2202 and the conical surface portion 2204, and formed as a cylinder portion 2208 located radially inward of the bulging portion 38.

Thus, in the present embodiment, a first curved surface portion is formed as the conical surface portion 2204, attached to the inner circumferential surface (conical surface 3204) of the skirt portion 32. In addition, a second curved surface portion located radially outward of the skirt portion 32 is formed including the portion of conical surface portion 2204 located radially outward of the skirt portion 32, and the uniform stress surface portion 2202 connected via the bending portion 2206 at the portion of the conical surface portion 2204 located outward in the radial direction of the skirt portion 32.

The inner liner 22 obtained by blow molding is, through the cylinder portion 2208, inserted into the interior of the bulging portion 38, and attached to the surface of the bulging portion 38 from the inner circumferential surface (conical surface 3204) of the skirt portion 32.

Note that, the conical surface portion 2204 of the inner liner 22 and the conical surface 3204 of the skirt portion 32 are attached with an adhesive, the cylinder portion 2208 to the end portion 2201 of the inner liner 22 are attached to the inner circumference surface of the bulging portion 38, the inclined surface 40, and the flat surface 3804 through thermal processing, and the surface of the end portion 2201 of the inner liner 22 rests on the same plane as the flat surface 3802.

In a present embodiment, the inner circumferential surface of the skirt portion 32 and the inner circumferential surface of the bulging portion 38 on the skirt portion 32 side are formed in a contiguous manner, such that the inner liner 22 may be smoothly attached across the inner circumferential surface of the skirt portion 32 through the surface of the bulging portion 38.

Further, since the end portion of the inner liner 22 can be securely attached conforming to the shape of the entire surface of the bulging portion 38 located radially inward of the mouthpiece-side joint portion (female screw 36), this allows the negative pressure applied to the interior of the tank to be mechanically (structurally) withstood rather than by the adhesive strength, which is advantageous in enhancing the mechanical and structural strength of the end portion of the inner liner 22. Further, it enables the end portion of the inner liner 22 to be efficiently attached to the surface of the bulging portion 38 located radially inward of the mouthpiece-side joint portion (the female thread 36), and enables whether the end portion of the inner liner 22 is attached to the surface of the bulging portion 38 to be visually confirmed easily from outside the mouthpiece 26, which is advantageous in improving the efficiency of attaching the inner liner 22 to the mouthpiece 26.

Further, since the flat surface 3804 is located at a section located radially inward of the female thread 36, it enables the end portion 2201 of the inner liner 22 to be attached to the flat surface 3804 efficiently, and whether the end portion 2201 of the inner liner 22 is attached to the flat surface 3804 to be visually confirmed easily from outside the mouthpiece 26, improving the efficiency of attaching the inner liner 22 to the mouthpiece 26.

The lid 34 includes an annular plate portion 44, a cylinder 46 protruding from the inner circumferential portion of one end surface of the annular plate portion 44 in the thickness direction, and an end surface portion 48 connecting the distal end of the cylinder portion 46.

A male thread 50 is formed as a lid-side joint portion to be joined to the mouthpiece-side joint portion on the outer circumferential portion of the annular plate portion 44, and the male thread 50 can be screwed into the female thread 36.

In addition, an O-ring 52 is mounted as a seal member at a section on the outer circumferential surface of the cylindrical portion 46 close to the end face.

A water containing space 12A closed inside the tank body 12 is formed as the opening 18 is closed in a liquid-tight manner, due to the O-ring 52 being compressed between a portion of the lid 34 protruding from the female thread 36 into the interior of the tank body 12 and the portion of the inner liner 22 attached to the surface of the bulging portion 38, in a state in which the lid 34 is joined to the opening 18 via the male thread 50 and the female thread 36 engaging.

In the present embodiment, in a state in which the opening 18 is closed by the lid 34, the end portion 2201 of the inner liner 22 is located at a section of the bulging portion 38 that is farther from the water containing space 12A than a section where the O-ring 52 is compressed. Thus, since the end portion 2201 of the inner liner 22 is positioned outside the water containing space 12A, this favorably prevents the pressure of the drinking water from peeling off the inner liner 22, and in the event where it is peeled off, this is advantageous in eliminating the risk of water entering and seeping out.

In the present embodiment, an embodiment in which the mouthpiece-side joint portion is formed with the female thread 36 and the lid-side joint portion is formed with the male thread 50 has been described. However, in another embodiment of the present technology, the mouthpiece-side joint portion is formed with a male thread, the lid side joint portion is formed with a female thread, or the lid 34 is covered with the tubular portion 30.

In the present embodiment, the inner liner 22 obtained by blow molding is formed with the uniform stress surface portion 2202 located radially outward of the skirt portion 32, and formed with the conical surface portion 2204 located radially inward of the skirt portion 32.

Thus, in attaching the inner liner 22 to the inner circumferential surface of the skirt portion 32, the conical surface 3204 which is the inner circumferential surface of the skirt portion 32 and the conical surface portion 2204 of the inner liner 22 are fit together, i.e., both conical surfaces fit together, hence it is easier to align them and join them in a secure manner with no air interposed therebetween over the entire area and to bond them with an adhesive, compared to the case in which uniform stress surfaces are fit together.

This is advantageous in increasing the manufacturing productivity of the aircraft water tank 10.

The portion where the inner liner 22 is attached to the inner circumferential surface of the skirt portion 32 is the conical surface portion 2204, the portion of the inner liner 22 exposed radially outward of the skirt portion 32 is the uniform stress surface portion 2202, and the bent portion 2206 occurs at the boundary section between the conical surface portion 2204 and the uniform stress surface portion 2202.

In the first embodiment, the bent portion 2206 is positioned radially outward of the skirt portion 32 in the vicinity of the outer circumferential end of the skirt portion 32.

The fiber-reinforced resin layer 24 is attached using the filament winding method, to the outer circumferential surface of the skirt portion 32 across to the inner liner 22 portion exposed radially outward of the outer circumferential surface of the skirt portion 32.

When the shape of the outer circumferential surface of the skirt portion 32 and the shape of the inner liner 22 exposed radially outward of the skirt portion 32 are formed with uniform stress surfaces, deformation of the tank dome line at the time of winding the fiber-reinforced resin layer 24 is minimized, which is advantageous in maximizing the pressure resistance performance.

For this reason, when the outer circumferential surface of the skirt portion 32 is formed with the uniform stress surface 3202 and the shape of the inner liner 22 exposed radially outward of the skirt portion 32 is formed with the uniform stress surface portion 2202, the outer circumferential surface of the skirt portion 32 has a certain manufacturing thickness though smaller than that known in the related art, hence a level difference is formed at a section located radially outward of the outer circumferential end of the skirt portion 32.

When the fiber-reinforced resin layer 24 is wound using the filament winding method around the outer circumferential surface of the skirt portion 32 and the outer circumferential surface of the inner liner 22 having such a level difference, a level difference inevitably is formed on the fiber-reinforced resin layer 24 at a section on the radially outward outer circumferential end of the skirt portion 32.

In the present embodiment, a reinforcing member 58 is provided between the inner liner 22 and the fiber-reinforced resin layer 24 located radially outward of the skirt portion 32 so as not to form the above-described level difference.

Attachment of the reinforcing member 58 is performed as follows.

Namely, in adhering together the inner circumferential surface of the skirt portion 32 and the outer circumferential surface of the inner liner 22, as the adhesive 54, for example, an epoxy resin which is the same epoxy adhesive as the adhesive used in forming the fiber-reinforced resin layer 24 on the inner liner 22 by the filament winding method, is used.

In the step of adhering together the inner circumferential surface of the skirt portion 32 and the outer circumferential surface of the inner liner 22 with an adhesive, the adhesive 54 (for example, epoxy resin) is expelled from between the inner circumferential surface of the skirt portion 32 and the outer surface of the inner liner 22, onto the outer circumferential edge of the skirt portion 32.

At this time, the reinforcing fibers 56 are stuck on the expelled adhesive 54, so that the reinforcing fibers 56 are impregnated with the adhesive 54. When the adhesive 54 to be impregnated into the reinforcing fiber 56 is insufficient, the adhesive 54 is further applied to the reinforcing fiber 56.

The outer circumferential end of the skirt portion 32 and the outer circumferential surface of the inner liner 22 projecting radially outward of the skirt portion 32 are then connected in a continuous manner by the expelled adhesive 54 and the reinforcing fiber 56.

When the expelled adhesive 54 cures, the cured adhesive 54 and the reinforcing fibers 56 constitute a reinforcing member 58, and the reinforcing member 58 connects the outer circumferential surface of the skirt portion 32 and the outer circumferential surface of the inner liner 22 located radially outward of the skirt portion 32 in a continuous manner. Namely, the reinforcing member 58 is provided in the vicinity of the outer circumferential end of the skirt portion 32 located radially outward of the skirt portion 32, and specifically, the reinforcing member 58 is disposed on the conical surface portion 2204 positioned radially outward of the skirt portion 32, continuously connecting the outer circumferential surface of the skirt portion 32 and the second curved surface portion of the inner liner 22. In other words, the uniform tension curved surface 3202 of the skirt portion 32 and the uniform stress surface portion 2202 of the inner liner 22 are continuously connected.

As the reinforcing fiber 56, for example, a glass cloth can be used. The glass cloth may be one glass cloth, or a plurality of glass cloths layered on one another.

According to the present embodiment, since the outer circumferential surface of the skirt portion 32 where the filament winding is performed and the outer circumferential surface of the inner liner 22 can be formed as continuous surfaces without a level difference, air can be prevented from being present between the two or the like, and the outer circumferential surface of the dome portion 16 finished by being wound up with the fiber-reinforced resin layer 24 is formed with a uniform stress surface having no level difference.

Thus, stress concentration can be suppressed, which is advantageous in increasing the durability of the aircraft water tank 10 repeatedly subjected to pressure.

In addition, the operation of wiping off the adhesive expelled to the outer circumferential edge of the skirt portion 32 and the time to cure the adhesive used to adhere together the skirt portion 32 and the inner liner 22, which have been required in the process of adhering the inner liner 22 to the skirt portion 32, becomes unnecessary. The process of adhering the inner liner 22 to the skirt portion 32 and the process of attaching the reinforcing material 58 may be performed in a single step. This is advantageous in increasing work efficiency and reducing cost.

Further, in the present embodiment, the imaginary extended surface of the uniform stress surface portion 2202 of the inner liner 22 is connected to the uniform tension curved surface 3202 of the skirt portion 32, and since the boundary section between the conical surface portion 2204 of the inner liner 22 and the uniform stress surface portion 2202 is located in the vicinity of the outer circumferential end of the skirt portion 32, the level difference occurring at the outer circumferential end section located radially outward of the skirt portion 32 is smaller than that known in the related art, and since the reinforcing fiber 56 that is impregnated with the adhesive 54 is used, the volume of the adhesive needed for filling the level difference is decreased. As a result, the task of filling the level difference can be completed manually.

Thus, it is unnecessary to rotate the inner liner 22 by the rotating device as it has been in the related art, and thus it is unnecessary to wait for the adhesive used to adhere the mouthpiece 26 to the inner liner 22 to cure, which is advantageous increasing working efficiency and reducing cost.

Second Embodiment

Figure 4A:
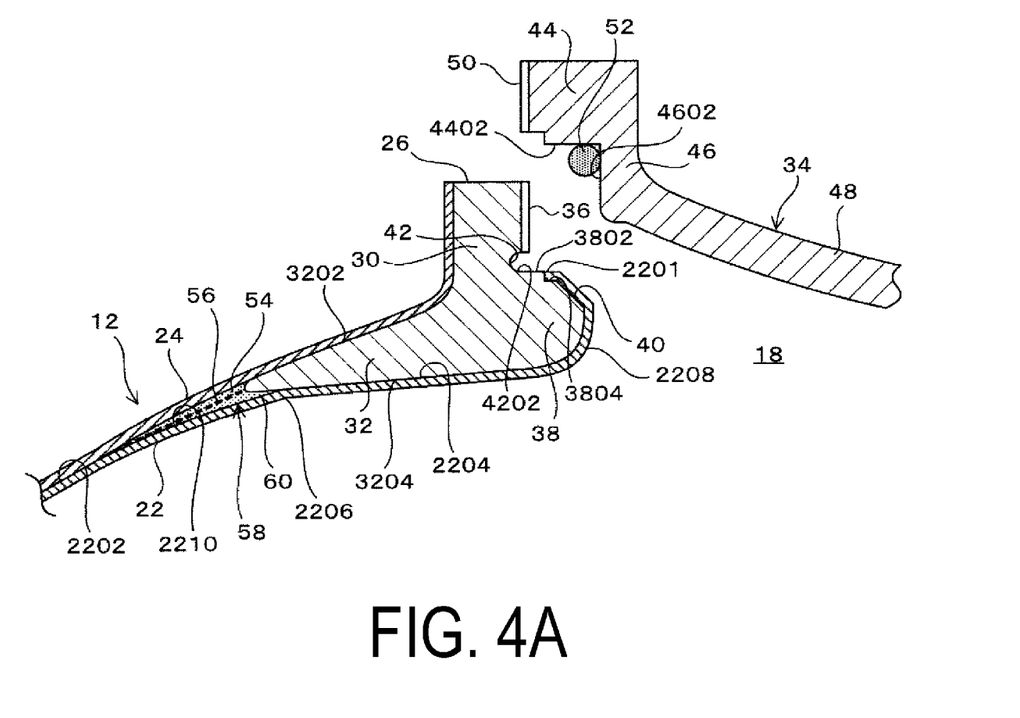
FIG. 4A is an enlarged view of a main portion of a mouthpiece and a lid in a state in which the mouthpiece and the lid are separated from each other in the aircraft water tank according to a second embodiment.
Figure 4B:
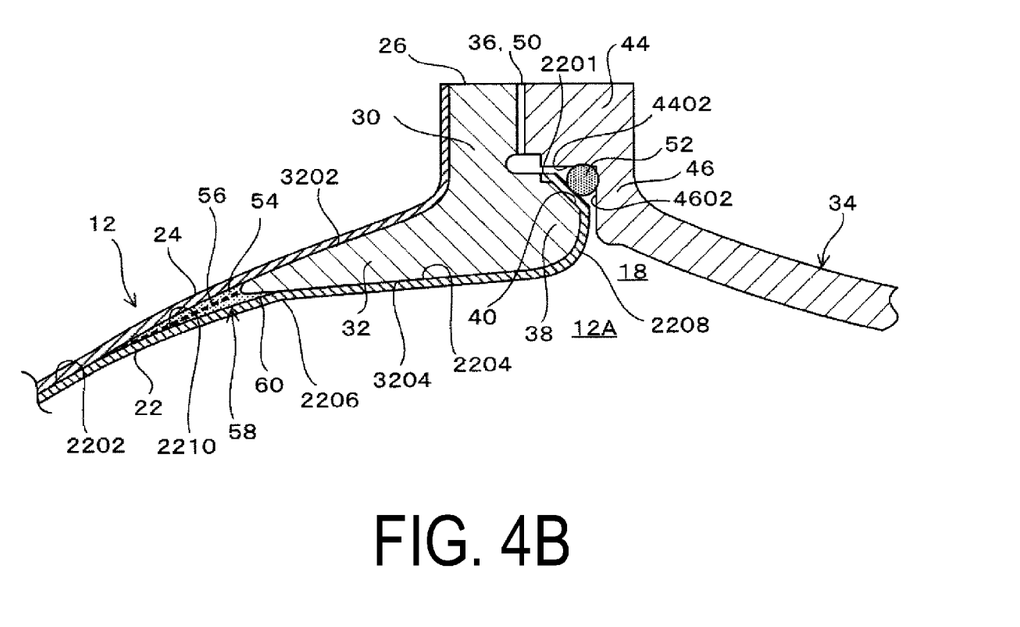
FIG. 4B is an enlarged view of a main portion of the mouthpiece and the lid in which the mouthpiece and the lid are joined, and the bent portion of the inner liner is located radially inward of the skirt portion of the mouthpiece.

Next, a second embodiment will be described with reference to FIGS. 4A and 4B.

Note that, this explanation of the second embodiment shall focus on differences from the first embodiment. Therefore, portions and members that are the same as in the first embodiment have the same reference signs and their explanations shall be omitted.

The second embodiment is different from the first embodiment in that the bent portion 2206 is positioned in the vicinity of the outer circumferential end of the skirt portion 32 and radially inward of the skirt portion 32, and the inner liner 22, in addition to being connected to the conical surface portion 2204 via the bent portion 2206, includes a connection curved surface portion 2210 which is continuously connected to the uniform stress surface portion 2202. Other points such as using an epoxy resin, for example, when bonding the inner circumferential surface of the skirt portion 32 and the outer circumferential surface of the inner liner 22, as the adhesive 54, which is the same epoxy adhesive as the adhesive used when forming the fiber-reinforced resin layer 24 on the inner liner 22 by the filament winding method, are the same as in the first embodiment.

Namely, in the second embodiment, the first curved surface portion attached to the inner circumferential surface (conical surface 3204) of the skirt portion 32 is formed with the conical surface portion 2204.

The second curved surface portion located in a radially outward of the skirt portion 32 is formed including the uniform stress surface portion 2202 located radially outward of the skirt portion 32, and the connection curved surface portion 2210 connected to the conical surface portion 2204 located radially inward of the skirt portion 32 through the bent portion 2206, and connected to the uniform stress surface portion 2202 located radially outward of the skirt portion 32 in a continuous manner.

Further, the imaginary extended surface of the uniform stress surface portion 2202 is connected to the uniform tension curved surface 3202 of the skirt portion 32.

In the second embodiment, between the conical surface 3204 of the skirt portion 32 and the connection curved surface portion 2210 of the inner liner 22, a space 60 is formed due to the difference in the curved shape radially inward of the skirt portion 32 and radially outward of the bent portion 2206.

For example, the connection curved surface portion 2210 is formed when the bulge of the portion of the inner liner 22 positioned near the outer periphery of the skirt portion 32 in forming of the inner liner 22 is insufficient and the conical surface portion 2204 of the inner liner 22 is insufficient.

In the second embodiment, the adhesive 54 expelled radially outward of the skirt portion 32, from between the conical surface 3204 of the skirt portion 32 and the conical surface portion 2204 of the inner liner 22 is filled in the space 60 formed from the difference in the curved surface shape.

Namely, in the process of bonding the conical surface 3204 of the skirt portion 32 and the conical surface portion 2204 of the inner liner 22 with the adhesive 54, the adhesive 54 is expelled to the outer circumferential edge of the skirt portion 32 from between the conical surface 3204 of the skirt portion 32 and the conical surface portion 2204 of the inner liner 22.

At this time, the expelled adhesive 54 fills in the space 60 between the conical surface 3204 of the skirt portion 32 and the connection curved portion 2210 of the inner liner 22 radially inward of the skirt portion 32 and radially outward of the bent portion 2206.

Further, outward of the skirt portion 32 in the radial direction, reinforcing fibers 56 are applied over the expelled adhesive 54 on the connection curved surface portion 2210 positioned radially outward of the skirt portion 32, such that the reinforcing fibers 56 is impregnated with the adhesive 54. Note that, when the adhesive 54 that fills in the space 60 between the conical surface 3204 of the skirt portion 32 and the connection curved surface portion 2210 of the inner liner 22, or the adhesive 54 that impregnates the reinforcing fiber 56 is insufficient, the adhesive 54 is further supplied.

Then, the reinforcing member 58 is provided on the connection curved surface portion 2210 located radially outward of the skirt portion 32 by the expelled adhesive 54 and the reinforcing fiber 56, and the reinforcing member 58 connects the uniform tension curved surface portion 3202 of the skirt portion 32 and the uniform stress surface portion 2202 of the inner liner 22 located radially outward of the skirt portion 32 in a continuous manner.

The second embodiment can obtain an effect similar to that of the first embodiment. Also, on the outer side of the bent portion 2206 in the radial direction, and between the conical surface 3204 which is the inner circumferential surface of the skirt portion 32 and the connection curved surface portion 2210 which is the outer circumferential surface of the inner liner 22, the space 60 formed due to the difference in these curved surface shapes is filled with the expelled adhesive 54. Thus, the inner liner 22 can be aligned and adhered to the inner circumferential surface of the skirt portion 32 without air entering between the two. This is advantageous for enhancing the durability of the aircraft water tank 10.

The invention claimed is:
1. An aircraft water tank, comprising:
a mouthpiece provided at a center of a dome portion, the dome portion comprising an inner liner and a fiber-reinforced resin layer,
the mouthpiece comprising;
a tubular portion penetrating through an opening of the inner liner and the fiber-reinforced resin layer and to which a lid is joined; and
a skirt portion extending radially outward, between the inner liner and the fiber-reinforced resin layer, from an entire outer circumferential portion of the tubular portion and attached around the opening to the inner liner and the fiber-reinforced resin layer with an adhesive; wherein
the inner liner comprises a first curved surface portion attached to an inner circumferential surface of the skirt portion and a second curved surface portion located radially outward of the skirt portion;
the first curved surface portion is attached to the inner circumferential surface of the skirt portion with an identical adhesive as that used in attaching the fiber-reinforced resin layer to the inner liner;

reinforcing fibers are provided at a portion of the second curved surface portion in a vicinity of an outer circumferential end of the skirt portion via the adhesive expelled from between the inner circumferential surface of the skirt portion and the first curved surface portion radially outward of the skirt portion; and
the adhesive expelled and the reinforcing fibers constitute a reinforcing member for connecting an outer circumferential surface of the skirt portion and the second curved surface portion of the inner liner in a continuous manner.
2. The aircraft water tank according to claim 1, wherein
the outer circumferential surface of the skirt portion is formed as a uniform stress surface, and the inner circumferential surface of the skirt portion is formed as a conical surface;
the first curved surface portion is formed as a conical surface portion attachable to the conical surface of the skirt portion;
the second curved surface portion comprises a portion of the conical surface portion located radially outward of the skirt portion, and a uniform stress surface portion connected to a portion of the conical surface portion via a bent portion radially outward of the skirt portion;
an imaginary extended surface of the uniform stress surface portion is connected to the uniform stress surface of the skirt portion; and
the reinforcing member is provided on the conical surface portion located radially outward of the skirt portion.
3. The aircraft water tank according to claim 2, wherein
a bulging portion connected to the skirt portion and bulges radially inward of the tubular portion is provided at a section close to a tank body in an axial center direction of the tubular portion at an inner circumferential portion of the tubular portion;
a mouthpiece-side joint portion to which the lid is joined is provided at a section away from the tank body in the axial center direction of the tubular portion at the inner circumferential portion of the tubular portion;
the bulging portion is provided so as to further project further radially inward than an inner diameter of the mouthpiece-side joint portion;
the bulging portion comprises a surface facing a space inside the mouthpiece-side joint portion at a section close to the mouthpiece-side joint portion of the bulging portion in the axial center direction of the tubular portion;
the inner liner is attached to a surface of the bulging portion from the inner circumferential surface of the skirt portion; and
an end portion of the inner liner is attached to a section of the surface located further radially inward than the inner diameter of the mouthpiece-side joint portion.
4. The aircraft water tank according to claim 3, wherein
a groove comprising an inner circumferential surface larger in dimension than an inner diameter of the mouthpiece-side joint portion is formed at a boundary section between the mouthpiece-side joint portion and the bulging portion at the inner circumferential portion of the tubular portion.
5. The aircraft water tank according to claim 1, wherein
the outer circumferential surface of the skirt portion is formed as a uniform stress surface, and the inner circumferential surface of the skirt portion is formed as a conical surface;

the first curved surface portion is formed as a conical surface portion attached to the conical surface of the skirt portion;

the second curved surface portion comprises a uniform stress surface portion located radially outward of the skirt portion, and a connection curved surface portion of the inner liner connected to the conical surface portion located radially inward of the skirt portion via a bent portion and connected to the uniform stress surface portion located radially outward of the skirt portion in a continuous manner;

an imaginary extended surface of the uniform stress surface portion is connected to the uniform stress surface of the skirt portion;

radially inward of the skirt portion and radially outward of the bent portion, in a space between the conical surface of the skirt portion and the connection curved surface portion of the inner liner, the adhesive expelled radially outward of the skirt portion from between the conical surface of the skirt portion and the conical surface portion of the inner liner is filled; and the reinforcing member is provided on the connection curved surface portion located radially outward of the skirt portion.

6. The aircraft water tank according to claim 5, wherein a bulging portion connected to the skirt portion and bulges radially inward of the tubular portion is provided at a section close to a tank body in an axial center direction of the tubular portion at an inner circumferential portion of the tubular portion;

a mouthpiece-side joint portion to which the lid is joined is provided at a section away from the tank body in the axial center direction of the tubular portion at the inner circumferential portion of the tubular portion;

the bulging portion is provided so as to further project further radially inward than an inner diameter of the mouthpiece-side joint portion;

the bulging portion comprises a surface facing a space inside the mouthpiece-side joint portion at a section close to the mouthpiece-side joint portion of the bulging portion in the axial center direction of the tubular portion;

the inner liner is attached to a surface of the bulging portion from the inner circumferential surface of the skirt portion; and an end portion of the inner liner is attached to a section of the surface located further radially inward than the inner diameter of the mouthpiece-side joint portion.

7. The aircraft water tank according to claim 6, wherein a groove comprising an inner circumferential surface larger in dimension than an inner diameter of the mouthpiece-side joint portion is formed at a boundary section between the mouthpiece-side joint portion and the bulging portion at the inner circumferential portion of the tubular portion.

8. The aircraft water tank according to claim 1, wherein a bulging portion connected to the skirt portion and bulges radially inward of the tubular portion is provided at a section close to a tank body in an axial center direction of the tubular portion at an inner circumferential portion of the tubular portion;

a mouthpiece-side joint portion to which the lid is joined is provided at a section away from the tank body in the axial center direction of the tubular portion at the inner circumferential portion of the tubular portion;

the bulging portion is provided so as to further project further radially inward than an inner diameter of the mouthpiece-side joint portion;

the bulging portion comprises a surface facing a space inside the mouthpiece-side joint portion at a section close to the mouthpiece-side joint portion of the bulging portion in the axial center direction of the tubular portion;

the inner liner is attached to a surface of the bulging portion from the inner circumferential surface of the skirt portion; and an end portion of the inner liner is attached to a section of the surface located further radially inward than the inner diameter of the mouthpiece-side joint portion.

9. The aircraft water tank according to claim 8, wherein a groove comprising an inner circumferential surface larger in dimension than aft the inner diameter of the mouthpiece-side joint portion is formed at a boundary section between the mouthpiece-side joint portion and the bulging portion at the inner circumferential portion of the tubular portion.

10. A method for manufacturing an aircraft water tank, the method comprising:

providing a mouthpiece at a center of a dome portion, the dome portion comprising an inner liner and a fiber-reinforced resin layer, the mouthpiece including;

a tubular portion penetrating through an opening of the inner liner and the fiber-reinforced resin layer and to which a lid is joined, and a skirt portion extending radially outward, between the inner liner and the fiber-reinforced resin layer, from an entire outer circumferential portion of the tubular portion and attached around the opening to the inner liner and the fiber-reinforced resin layer with an adhesive; wherein the inner liner is formed with a first curved surface portion attachable to an inner circumferential surface of the skirt portion and a second curved surface portion located radially outward of the skirt portion;

the first curved surface portion is attached to the inner circumferential surface of the skirt portion with an identical adhesive as that used in attaching the fiber-reinforced resin layer to the inner liner;

reinforcing fibers are provided at a portion of the second curved surface portion in a vicinity of an outer circumferential end of the skirt portion via the adhesive expelled from between the inner circumferential surface of the skirt portion and the first curved surface portion radially outward of the skirt portion; and the adhesive expelled and the reinforcing fibers constitute a reinforcing member for connecting an outer circumferential surface of the skirt portion and the second curved surface portion of the inner liner in a continuous manner.

* * * * *